United States Patent [19]

Sievers

[11] Patent Number: 5,099,793
[45] Date of Patent: Mar. 31, 1992

[54] FARROWING SHED

[76] Inventor: Roger B. Sievers, R.R. 1, Box 41C, Meppen, Ill. 62064

[21] Appl. No.: 441,542

[22] Filed: Nov. 27, 1989

[51] Int. Cl.⁵ .............................................. A01K 1/00
[52] U.S. Cl. ........................................ 119/16; 119/28
[58] Field of Search ...................... 119/16, 20, 27, 28

[56] References Cited

U.S. PATENT DOCUMENTS

| | | | |
|---|---|---|---|
| 391,858 | 10/1888 | Randleman | 119/16 |
| 436,902 | 9/1890 | Osborn | 119/16 |
| 523,996 | 8/1894 | Randleman | 119/16 |
| 1,230,237 | 6/1917 | Sturm | 119/16 |
| 3,584,603 | 6/1971 | Rutherford | 119/16 |
| 4,442,792 | 4/1984 | Nehring | 119/16 |

*Primary Examiner*—John G. Weiss
*Attorney, Agent, or Firm*—Paul M. Denk

[57] ABSTRACT

A farrowing shed constructed to reduce the incidence of crushing of the infant pigs by the sow during farrowing and to facilitate the maintenance and servicing of the shed during usage, the shed having a pair of sidewalls, front and back walls connecting between the side walls, an inclined floor, which may be formed of slats, to provide ventilation therethrough, a roof constructed onto the assembled walls, and a front pivotal gate arranged on an incline to provide convenient access into the shed; the interior of the shed is formed having two compartments, one for locating the farrowing pigs at the front portion thereof, while the back portion of the shed forms a sow compartment, the two compartments being separated by a divider, either formed of wood slats or metal rails, which rails may be stragecially located to effectively prevent the crushing of any infant pigs by the sow.

10 Claims, 2 Drawing Sheets

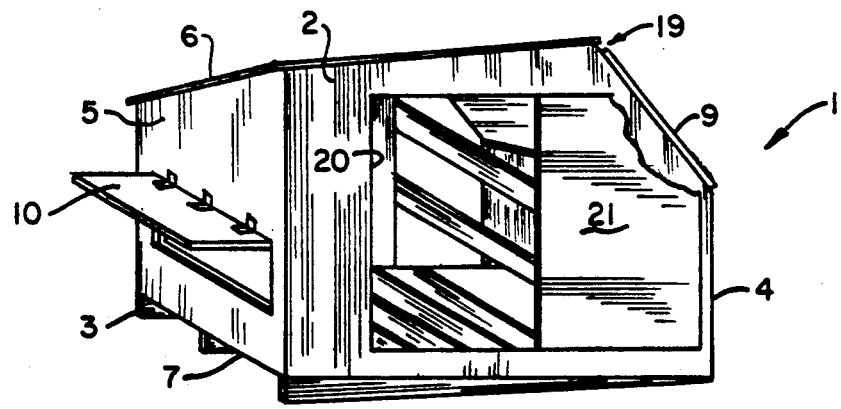
FIG. 1.
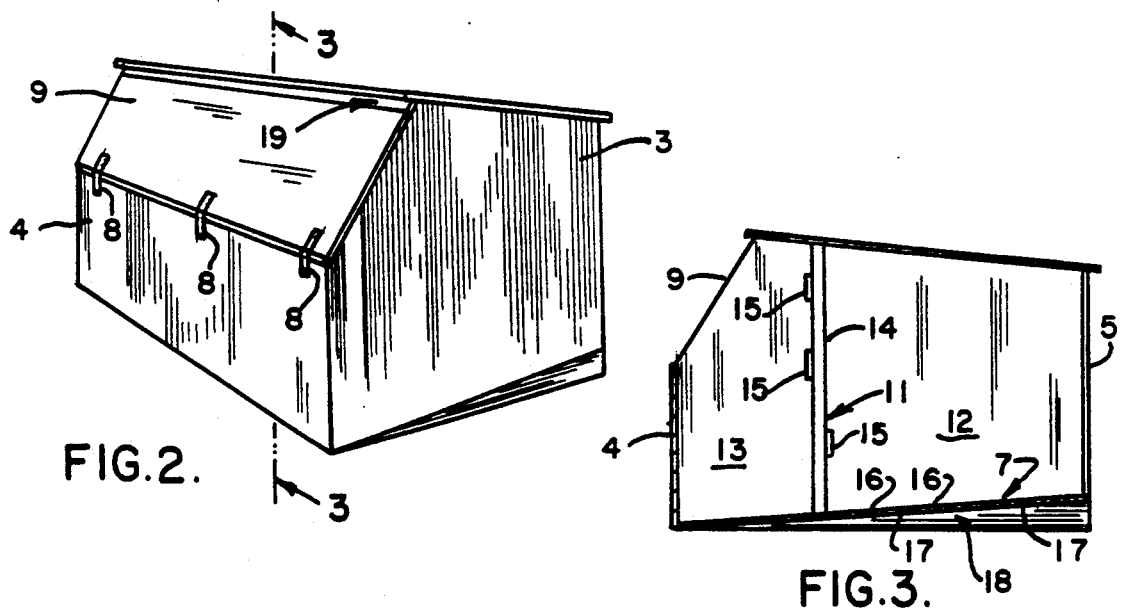
FIG. 2.
FIG. 3.
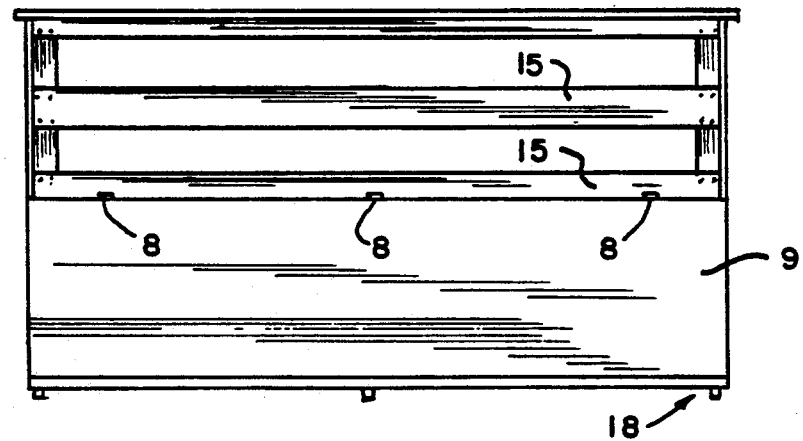
FIG. 4.

FARROWING SHED

BACKGROUND OF THE INVENTION

This invention relates to a new and useful improvement in farrowing shed, and more specifically one which has multiple purpose for primarily reducing the incidence of the death encountered by the farrow, or select of its infant pigs, during farrowing, and until weaned from the sow, while at the same time facilitating the maintenance and clean out of the shed during and after its application and usage.

There are a large variety of bins, sheds, and other makeshift type of compartments for holding the sow, and the young piglets, in addition to the farrowing stock, for the purpose of providing a compartmentalized means for containment of the infant pigs, and the farrow, during that stage of their young life. For example, the total livestock concept that has been developed by a Company entitled Randy Eiler, which Company manufactures a bin with a pivotal open roof, normally flat, having sloping sides, and a slatted floor, which floor may be either of wood slats, or of polymer coated heavy expanded metal. The bin is used for farrowing of infant pigs.

A Company by the name of Wilson Miraco, of McNabb, Il, manufactures a farrowing device which is nothing more than metal railing forming four sides of a bin having an enclosure at one end. The sow and her farrow all just occupy the same space within the bin. A Company by the name of Starr National, of Colchester, Il, manufactures a similar type of metal railing form of bin, having a feeder at one end, wherein the pigs may be farrowed.

A company by the name of Klein Manufacturing Co., of Burlington, Ia, manufactures a type of a pen for an individual sow, manufactured of heavy metal rods, that generally confines the sow within the pen, but allows farrowing thereunder. This type of device is really a form of a pen, for an individual sow, and incidentally can be used during farrowing. Lifetime Products, of Kewanee, Il, provides a farrowing crate that is likewise fabricated substantially of metal rods, and frames, wherein the bottom metal rail has downwardly extending fingers with arranged spacings to provide easy access for the nursing pigs. This is provided to either side of the crate.

A company by the name of R. L. Slang, and Agri-Equipment, Inc., furnishes a variety of metal type bar fabricated stalls, for use by the sow, even during farrowing, but other than providing means for segregation between the sow, and the infant pigs, it affords no other advantages in its usage.

A company by the name of Lester's Engineered Building Systems, of Lester Prairie, Mn, has a metal fabricated farrowing house, which appears to be totally fabricated of metal, having metal perforated floors, and which provides for farrowing of the infant pigs by the sow. In addition, this company makes various types of nurseries for use by the infant pigs during early weaning times.

SUMMARY OF THE INVENTION

This invention contemplates the formation of a farrowing shed, which may be used individually, or arranged in adjacency with a multitude of the same, to afford convenient and safe farrowing of the infant pigs, by the sow, under relatively safe conditions, substantially minimizing the incidence of death by crushing to the infant pigs, while at the same time furnishing a shed that is constructed to incorporate various safety features, convenient ventilation, and easy access, during application, usage, and clean out.

It is common knowledge and experience amongst pig farmers that in any litter of farrowing pigs, on the average approximately two to three out of a litter of twelve can expect it to be laid upon by the sow, crushed to death, at a total loss to the farmer. This normally occurs, as experienced by the applicant, within the first three days after the birth of a litter. The current invention, as designed, is designed to provide means for initially avoiding and minimizing that type of tragic statistic experienced during the raising of pigs, by constructing a crate that incorporates a sloping floor, of approximately four degree slope, within the interior of a shed, so that the sow will be maintained on the up hill, inclined side of the floor, with the farrowing litter arranged down the slope, and in that way have a tendency to be urged away from the sow, when not nursing, and thereby reducing substantially the incidence of their being crushed.

This proposal can be substantiated by the applicant by providing statistical proof of the effectiveness of the operations of his farrowing shed as follows.

The applicant has had ten sows farrow ten litters of pigs through to weaning, and during this performance, he has had sows give birth to two litters of twelve, and through the usage of his invention, has not lost a single infant pig from these two litters, during usage of his invention. In another litter of ten, one pig starved, on its own. In a further litter of nine, one of the pigs was actually laid upon by the sow, and crushed. Of six other litters during farrowing, one included a litter of thirteen piglets, of which only one pig starved to death. His sows gave birth to three other litters of twelve, and none of the infant pigs was lost. There was another litter of eleven, and a tenth litter of ten infant pigs, none of these farrowing pigs were lost. Hence, from ten litters, including a total of one hundred, thirteen infant pigs, only three died, and, remarkably, only one of those died because of crushing. This occurred through the usage of applicant's invention. On the other hand, statistics compiled through usage of other farrowing bins, and even of the type as previously summarized herein, and as actually experienced by the applicant, it is customary to lose through crushing one to three infant pigs from the litter, during farrowing, from a standard litter of approximately ten to eleven farrowing pigs. Thus, through usage of applicant's invention, and through experimentation through usage, death particularly by crushing of the infant pig has been substantially reduced, if not almost eliminated, through usage of this development.

In addition, applicant's invention as fabricated includes a shed like means that incorporates a pair of side walls, front and back walls, a bottom wall, roof, and an inclined portion incorporated into the front wall that may be pivoted, preferably downwardly, so as to open a large segment of the front wall, upon an incline, and allow for easy access into the shed, to attain access to the infant pigs, or for clean out purposes. This cannot be achieved from any of the prior art. In addition, the bottom wall of the shed is arranged upon an incline, of approximately two degrees to six degrees, but more preferably in the area of approximately four degrees, inclined downwardly from back to front, so that the farrowing pig compartment formed at the front of the shed will always and consistently urge the infant pigs further forwardly, and away from the sow, which has been found most effective for substantially preventing the pigs from coming into contact, or being laid upon, by the mother sow. This incline is preferably provided upon the entire length of the floor, from the back wall to the front wall, or may even be provided only within the back compartment, wherein the sow locates, so that if the piglets remain in the farrowing compartment area, they are free from the sow, and cannot be crushed. On the other hand, if they move into the area of the sow compartment, for nursing, and lose their footing, or when finished, they will generally roll back along the incline towards the front of the shed, and into its farrowing compartment.

A further attribute of this invention is the formation provided for the inclined floor for the shed. This floor may be fabricated of solid material, such as plywood, or other wood, or formed of tongue and groove for reinforcement purposes, or it may be fabricated from slats, and provide a slight spacing between each, so as to furnish proper and convenient ventilation up through the floor, as a result of the back edge of the shed being elevated, to thereby allow fresh air to enter into and underneath the flooring, at this location, and permeate upwardly through the floor slats for cooling or ventilation purposes.

Another feature of this invention is the provision of a divider, between the farrowing and sow compartments, and this divider may be fabricated of wood slats that are parallel arranged and vertically aligned approximately two feet, more or less, from the front of the shed. Or, this divider may be fabricated of metal rods, likewise vertically aligned, with the exception of two rods that may be conveniently contoured so as to cooperate with the shape of the sow, when resting upon her side, and facilitate a posture of feeding. For example, the bottom rod may be contoured outwardly, towards the front of the shed, to conveniently fit and comfort the back of the sow when resting upon her side, and in a nursing posture. In addition, and in the event that one of the infant pigs may maneuver towards the back of the shed, there is a second rod provided at that location, upwardly from the floor, and slightly inwardly from the back wall, so that should a pig enter into that position, for the purpose of nursing, in the event that the sow has reversed in her laying position, that barrier rod will prevent the sow from lying down upon any infant pig arranged at that position, to prevent its crushing.

Another feature of this invention is the provision of doorways to either one or both sides of the shed, so as to allow for the convenient access into or from the interior of the shed. This is primarily provided for the convenience of allowing the sow to pass into the shed, as required. In addition, and so as to add further ventilation, a shallow door may be provided through the back wall of the shed, for cooling purposes. In addition, it allows the farmer to attain quick access in the shed in the event that it is necessary to remove a farrowing pig who has become relocated towards the back of the shed, as previously explained.

In addition to the foregoing, it is likely that a series of these farrowing sheds can be arranged within a barn, aligned side by side in adjacency, and therein provide a convenient arrangement for farrowing of a plurality of litters, up to forty in number, within a single barn, which is quite significant from the manner in which such bins have been previously arranged to handle the processing of a much smaller number of litter of farrowing pigs. In practice, for a barn of approximately seventy feet in length, and twenty-four feet in width, applicant's farrowing sheds can be arranged in four rows, of ten each, along the barn, and even provide passageway spacings between select of their rows, for the convenience for the access of the farmer in processing of the pigs. This provides for a total of forty sheds within a single barn of this dimension. To the contrary, a barn of similar size, in the prior art, could only handle approximately twenty-four of the available bins, when located within the barn structure, due to the construction of such prior art bins.

It is, therefore, the principal object of this invention to provide a farrowing shed which conveniently adds to the handling of infant pigs, substantially reduces their death through crushing, or even starving, adequately ventilates all aspects of the shed, while likewise providing structure for facilitating the services and clean out of the shed during its application and usage.

Still another object of this invention is to use an arrangement of divider means within a farrowing shed that convenient separates a sow locating compartment from the farrowing litter compartment, and to assure that death by crushing does not occur.

Still another object of this invention is to provide a barrier means or rod proximate the back wall of the sow compartment of a farrowing shed so as to reduce damage to any infant pig mislocated at that position.

Another object of this invention is to provide a farrowing shed that has substantially reduced the number of deaths per litter of infant pigs during farrowing, and up into the weaning stage.

Yet another object of this invention is to provide a farrowing shed that stays cooler in the warm summer months, and yet is sufficiently warm during the cooled and cold winter months.

Yet another object of this invention is to provide a farrowing shed that makes it very easy to process infant pigs.

Still another object of this invention is to provide a farrowing shed that has sufficient access into it, and all of its various compartments, so as to eliminate the need for the farmer to physically enter into the sow portion of the shed, as must be done with the various prior art devices.

Yet another object of this invention is to provide a farrowing shed that is so constructed to reduce the incidence of the scour problem, or diarrhea, because of much better ventilation achieved from the structure of this invention.

Yet another object of this invention is to provide a farrowing shed that can be cleaned in substantially less time than required for prior art bins.

Another object of this invention is to provide a farrowing shed, so constructed that a plurality of them can be more conveniently and compacted arranged within a barn, to handle many more litters of infant pigs than can be attained through the assembly of prior art bins.

These and other objects will become more apparent to those skilled in the art upon reviewing this summary of the invention, and the description of the preferred embodiment, in view of the drawings.

BRIEF DESCRIPTION OF THE DRAWINGS

In referring to the drawings, FIG. 1 is an isometric view of the farrowing shed of this invention, with a portion of its side door being removed;

FIG. 2 is a perspective view from a front angle of the farrowing shed of this invention;

FIG. 3 is a sectional view taken along the line 3—3 of FIG. 2;

FIG. 4 is a front view of the farrowing shed of this invention with its upper pivotal inclined portion being pivoted downwardly into an open disposition;

DESCRIPTION OF THE PREFERRED EMBODIMENT

Figure 5:
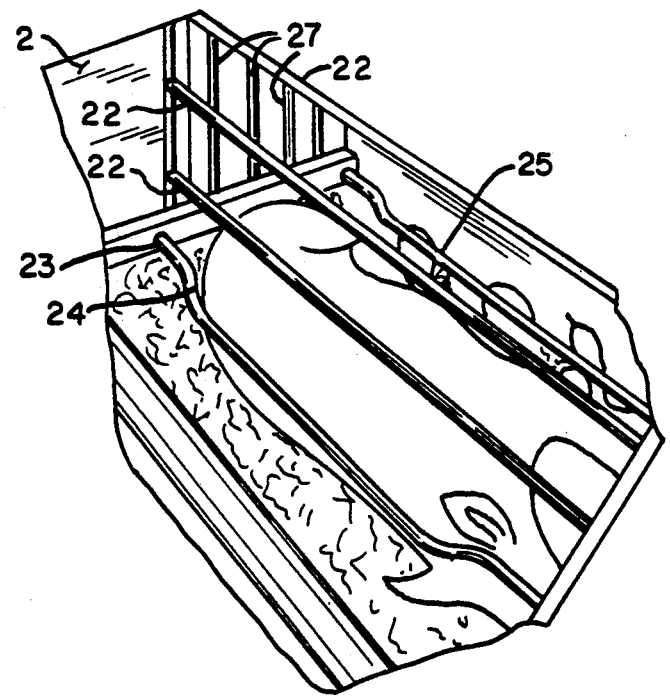
FIG. 5 is a partial interior view of a modification to the farrowing shed of this invention showing a sow resting within the sow compartment, and showing the various divider means, barrier bar, all as arranged for the purpose of sheltering the infant pigs from the nursing sow.

In referring to FIG. 1, the farrowing shed 1 of this invention is adequately disclosed. It includes a pair of sidewalls 2 and 3, a front wall 4, and a back wall 5, a roof 6, and a bottom wall 7. As can be seen in FIG. 2, the front wall 4 has hingedly connected to it, as along the hinges 8, an inclined movable portion 9 which may be pivoted downwardly, into an opened disposition, and thereby allow easy access into the shed. The back wall 5 of the shed includes another door means, as at 10, which is hingedly connected to the said back wall, and can be pivoted upwardly, to provide extra ventilation when needed.

Within the interior of the shed is provided a divider means, as at 11, and which forms the interior of the shed into two compartments, one comprising the sow arranged compartment, as at 12, and forwardly of the divider 11 is the farrowing compartment 13, as noted. The divider 11 is formed of a pair of vertical braces, as at 14, and include a series of transverse or cross rails 15 which are parallel arranged and vertically aligned for the purpose of segregating the two compartments from one another. Yet, adequate spacing is provided under the rail to allow access of the pigs to the sow during nursing. As can be seen, the floor 7 of the shed is arranged upon an incline, and preferably has a slope, as previously explained, of approximately two degrees to six degrees in inclination, slanting downwardly from the back wall 5 to the front wall 4 of the embodiment. Generally, a drop of approximately slightly in excess of four degrees, or a four inch drop in approximately a four and one-half foot length for the shed, has been found adequate. Generally, the purpose for this incline, as previously explained, is to arrange the sow in the upper inclined sow compartment 12, and hopefully keep the farrowing pigs in the segment 13, so that the pigs when they are initially born, and when nursing, will naturally go down hill and stay away from the sow for much greater periods of time, and thereby substantially reduce the incidence for their crushing, by the sow, as has frequently occurred. Furthermore, the applicant has found that the sows themselves appear to be much more relaxed and satisfied when maintained in a more segregated condition, uphill from their own litter, apparently or perhaps instinctively knowing that the infant pigs are arranged downwardly, and out of the path of her recline.

As can also be seen in FIG. 4, with the movable door 9 being pivoted downwardly about its hinges 8, convenient access upon an incline is provided directly into the farrowing compartment of the shed, which greatly facilitates the ability of the farmer to attain direct access to them, within his/her reach, for servicing them. This allows the farmer to easily attain access therein for removal of the litter, as may be required, or for clean out of the floor, at this proximate location.

Furthermore, as can be seen in FIGS. 3 and 4, the floor may be fabricated from either a solid flooring material, in the manner as previously explained, or it may be made from a series of slats, as at 16, having spacings, as at 17, arranged intermediately thereof. The purpose for this is that due to the incline of the floor, and its slight elevation off of the ground upon which it rests, there is adequate clearance, in the vicinity of 18, from both back to front of the shed, to allow convenient cool air and ventilation to pass therethrough, and up through the slots 17, to attain access into the interior of the shed, for cooling purposes. This has been found to be a highly desirable feature for addition into the structure of this invention, and adds to the convenience and comfort of the sow, and her litter, particularly while farrowing.

In addition, it can be seen that along the upper edge of the movable door 9, there is another spacing, as at 19, provided therethrough, and which allows for ventilation into the upper segment of the shed, so that circulation of air from bottom to top, or from top to bottom, as may be desired, can be achieved through the structured arrangement of the components of this invention. This space also allows elevated hot air, in the summer, to escape.

As can also be seen, a doorway aperture, as at 20, may be provided through 1 or both of the sidewalls 2 and 3 of this shed. Pivotal doors, as at 21, are provided for furnishing closure to these door apertures, as may be desired. While FIG. 2 may not show such a door provided through the wall 3, it is just as likely that a similar door, with aperture, as that as shown in FIG. 1, at 20 and 21, can be conveniently provided through the said wall 3.

A modification to the internal structure of this invention can be seen in FIG. 5. The divider as formed therein, is fabricated of a series of rails, as at 22, which are parallel arranged, and vertically aligned, as can be seen. On the other hand, the bottom rail 23, may be slightly offset, arranged slightly forwardly, and be contoured, in the manner as shown at 24, to accommodate a resting contiguity for the back of the sow when lying prone and in a nursing position. As can also be seen, a barrier rail 25 may be provided inwardly from the back wall, at approximately six inches therein, and arranged about eleven inches from the bottom, so that in the event the sow should turn from its normally nursing position, directed towards the farrowing chamber 13, and lie in a reverse direction, as shown in FIG. 5, facing the rear of the shed, in which event the infant pigs will have a tendency to crawl upwardly and rearwardly within the shed, to attain access to the sow's nipples for nursing, this barrier rail 25 will prevent the sow from crushing the infant piglets disposed thereat, and minimize the incidence of death by crushing as has so frequently occurred in the prior art. In addition, as previously explained, access into the back portion of the shed 5 can be attained through that hinged door 10, as shown in FIG. 1, and operated used in the manner of usage as previously explained.

Figure 6:
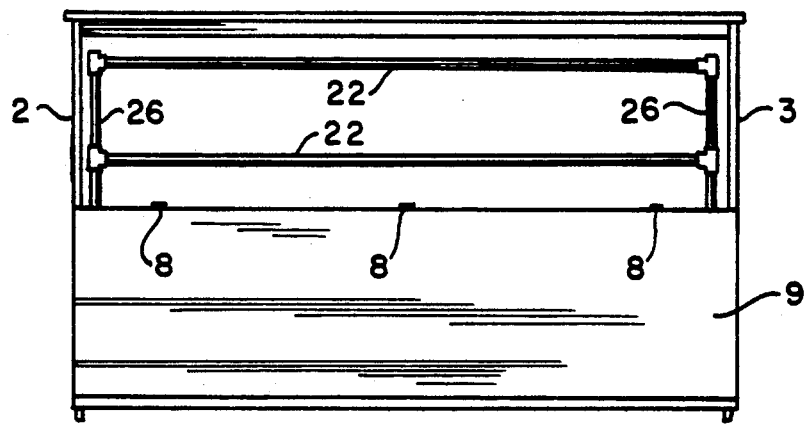
FIG. 6 is a similar view to that of FIG. 4, but showing the metal bar type of divider provided within the farrowing shed with its inclined portion being pivoted into a downwardly opened disposition.

The arrangement of the vertical side rails 26 within the farrowing shed, and the parallel rails 22 for this style of shed, and its divider means, can be seen from the front view, as provided in FIG. 6. In this figure the movable door 9 has been pivoted downwardly, about its hinges 8. In addition, as can be seen in FIG. 5, the side doors or gates provided through the side walls 2 and 3 may be fabricated also of a series of a bars, as shown at 27. These may be formed into a door configuration, and pivoted outwardly, for opening, in a manner as shown for the door 21, and to close its aperture 20.

Because of the unique feature of the division provided between the sow compartment and infant pig compartment of this shed, and the various of apertures and doors provided therethrough, after the infant pigs have been weaned at approximately three to five weeks of age, they can easily be conveniently handled, and the sow removed from the crate, through the various doors 21, while at the same time, the infant pigs can be left therein because this particular shed is of a size that is equivalent to a nursery pen for baby pigs, and the pigs will naturally do better therein due to avoidance of the stress of moving. Some farmers desire to leave their pigs within the pen, or within the farrowing shed, for an additional week or more, just to reduce that stress upon them. Furthermore, because of that pivotal door 9, it is much easier to get to the infant pigs within this system to effect their further processing, such as the cutting of teeth, so they do not bite the sow's nipples, and to eliminate fights between the infant pigs, as frequently occurs. In addition, because of the incline nature of the movable gate 9, it is much easier to attain access to the infant pigs, to give them their iron shots, to dock their tails, to castrate them, or to notch their ears, all procedures that are commonly performed by the farmer.

Figure 7:
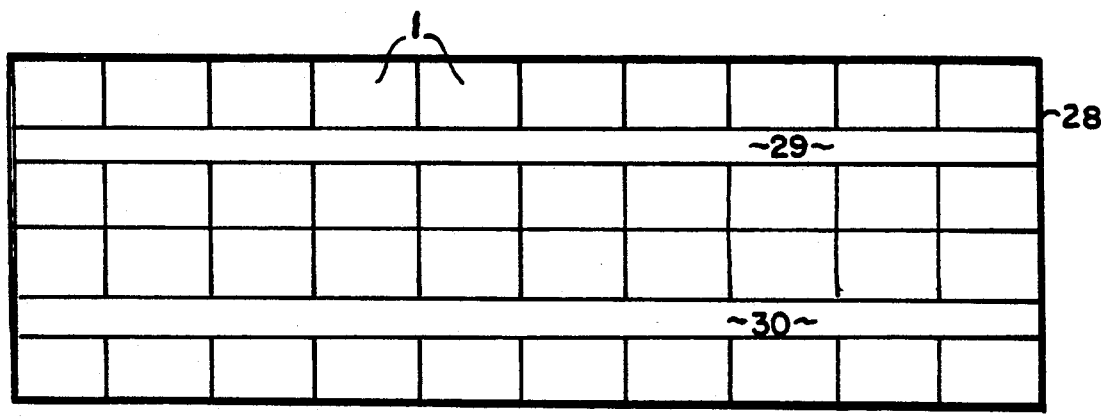
FIG. 7 shows a plan view of a barn, with the arrangement of forty of the farrowing sheds of this invention arranged in four rows, disposed in side-by-side adjacency, conveniently fitted therein.

Another feature and added advantage to this invention is that because of the unique size and arrangement of this shed, they can be more compactly arranged within a barn. For example, the shed of this design will be approximately five feet in depth, be approximately seven feet, two inches in width, and is three feet high upon their back side, and approximately two feet high to the hinge point at the front wall with the inclined gate 9. In any event, the basic dimension of each shed is approximately five feet by seven feet, which provides for their convenient locating within the standard barn of approximately seventy feet long, and twenty-four feet wide. Thus, as previously explained, and as can be seen in FIG. 7, ten of the sheds of this invention can be arranged in four rows each along the length of a barn, such as shown at 28. In addition, because of this positioning, two aisles, as at 29 and 30, can be conveniently provided along the length of the barn, so that each of the sheds can be conveniently reached, particularly at their pivotal front gate 9, to attain access for further processing and handling of the infant pigs, and their mothering sow. The various gates, such as explained at 27, may be provided to both sides of the shed, and pivot inwardly, so that the farmer can attain access to the sow, arranged within each shed, and as located within her sow compartment 12. This just provides the unique feature of this invention, and due to its construction, and having conveniently arranged gates, doors, and apertures, at particular locations, provides ready access to both the infant pigs, of each litter, and the nursing sow, for handling of at least forty of them, within a barn particularly during the winter months. On the other hand, each farrowing shed may be used independently, such as within a barn, or outdoors, as may be desired, as during the spring, summer and fall months, when processing of a multitude of sows, and handling their litters, in a convenient and safe manner, afforded through the usage of the shed structure of this current invention.

Variations or modifications to the structure of this invention may occur to those skilled in the art upon reviewing the invention as described herein. Such variations or modifications, if within the spirit of this invention, are intended to be encompassed within the scope of any claims to patent protection issuing upon this development. The description of the preferred embodiment set forth herein is done so for illustrative purposes only.

Having thus described the invention what is claimed and desired to be protected by Letters Patent is:

1. A farrowing shed constructed to reduce the incidence of crushing of the infant pigs by the sow during farrowing, and to facilitate the maintenance and servicing of the shed during usage, comprising, said shed having a pair of sidewalls, front and back walls connected between said side walls, and a roof and floor therefore, the interior of the shed having a pair of compartments formed entirely within the said assembled walls of the shed, one compartment for locating of the sow, the other compartment of the shed for locating of the farrow, a divider separating said compartments contained within the shed, said divider comprising a series of parallel arranged and spaced apart vertically aligned rail means extending from one side wall to the other side wall of the shed, said farrow having access to the sow through the divider, the floor of the shed having a slope in the direction of the farrow located compartment towards the infant pigs to direct them away from the sow when nursing is completed, said floor slope is between about 2° to 6°, said front wall having an aperture therethrough, a movable portion hingedly connected within said front wall aperture, said movable portion being hinged to the shed upon one of the upper and lower edges of its formed aperture, whereby said movable portion may be pivoted open to provide clear and convenient access into the shed to service the infant pigs, sow, or to clean both said compartments, said movable portion comprising an inclined portion provided within the front wall of the housing, and said movable portion having a height approximately one-half of the height of the front wall and disposed at the approximate upper one-half of said front wall, said farrow compartment provided between the divider and the front wall of the shed, with access being attainable into the farrow compartment through the movable portion, there being a spaced provided between the upper edge of the front wall aperture of the inclined portion and the roof to furnish permanent ventilation into an upper section of the shed, a hinged door provided through the back wall of the shed, to provide clear access into the entire sow compartment, there also being a door provided through one of the side walls of the shed, and a barrier rail proximate the lower back wall of the shed to prevent the sow from crushing any infant pigs arranged adjacent the back wall thereof, said barrier rail having a height approximating the height of the lowest rail means provided at the bottom of the divider separating the said compartments contained within the shed, in order to provide for protection for the infant pigs both at the front and back of the sow locating compartment.

2. The invention of claim 1 and wherein said floor slope is approximately four degrees.

3. The invention of claim 1 and wherein said slope for the floor being only in the sow compartment of the shed.

4. The invention of claim 1 and wherein said floor is a solid floor.

5. The invention of claim 2 and wherein said floor is a slatted floor, to provide ventilation for cooling of the interior of the farrowing shed.

6. The invention of claim 5 and there being a space provided between the slatted floor and the ground upon which the shed rests to provide for lower ventilation through the floor of the shed, said slats of the slatted floor extending from one side wall to the other side wall of the said shed.

7. The invention of claim 1 and including a door provided through both of said side walls of the shed.

8. The invention of claim 7 and including a series of said sheds being arranged adjacent each other within a confinement building to provided a compact arrangement of a multitude of said sheds for usage and servicing of a series of sows and their farrows.

9. The invention of claim 8 and including four parallel rows of ten sheds each being adjacently arranged within a confinement building to provide for a compact arrangement of a multitude of said sheds for usage and servicing of a series of sows and their farrows.

10. The invention of claim 1 and wherein both the bottom rail means of the divider, and the barrier rail provided proximate the lower back wall of the shed being contoured to accommodate the fit of the sow as during nursing.

* * * * *

UNITED STATES PATENT AND TRADEMARK OFFICE
CERTIFICATE OF CORRECTION

PATENT NO. : 5,099,793
DATED : March 31, 1992
INVENTOR(S) : Roger B. Sievers, It is certified that error appears in the above-identified patent and that said Letters Patent is hereby corrected as shown below:

Column 9, Claim 5, line 15, change "2" to ---1---.

Column 10, Claim 8, line 7, change "provided" to ---provide---.

Signed and Sealed this

Twenty-fifth Day of May, 1993

Attest:

MICHAEL K. KIRK

Attesting Officer

Acting Commissioner of Patents and Trademarks